(12) United States Patent
Stec et al.

(10) Patent No.: US 12,724,110 B2
(45) Date of Patent: Sep. 1, 2026

(54) MOUNTING BRACKET FOR A RADAR SENSOR

(71) Applicant: Aptiv Technologies AG, Schaffhausen (CH)

(72) Inventors: Robert Stec, Cracow (PL); Armin Talai, Nuremberg (DE)

(73) Assignee: Aptiv Technologies AG, Schaffhausen (CH)

( * ) Notice: Subject to any disclaimer, the term of this patent is extended or adjusted under 35 U.S.C. 154(b) by 422 days.

(21) Appl. No.: 18/122,772

(22) Filed: Mar. 17, 2023

(65) Prior Publication Data

US 2023/0341512 A1 Oct. 26, 2023

(30) Foreign Application Priority Data

Apr. 22, 2022 (EP) .................................... 22169495

(51) Int. Cl.
*G01S 7/02* (2006.01)
*G01S 13/931* (2020.01)

(52) U.S. Cl.
CPC ............ *G01S 7/027* (2021.05); *G01S 13/931* (2013.01); *G01S 2013/9327* (2020.01)

(58) Field of Classification Search
CPC ................... G01S 7/027; G01S 13/931; G01S 2013/93275; G01S 2013/9327; G01S 2013/93274; G01S 2013/93272; G01S 7/521; B60R 2011/0003
See application file for complete search history.

(56) References Cited

U.S. PATENT DOCUMENTS

2016/0370456 A1* 12/2016 Emanuelsson ........ G01S 13/931
2017/0207513 A1* 7/2017 Miyoshi ................... H01Q 1/38
2022/0013885 A1* 1/2022 Yang ...................... H01Q 1/525

FOREIGN PATENT DOCUMENTS

JP 2010213160 A 9/2010

OTHER PUBLICATIONS

Extended European Search Report issued by the European Patent Office in connection with International Application No. 22169495.3, dated Oct. 4, 2022.
Second Office Action regarding Chinese Patent Application No. 202310158624.5, dated Oct. 1, 2025. Translation 1 provided by Google Translate.

* cited by examiner

*Primary Examiner* — Resha Desai
*Assistant Examiner* — Peter Davon Doze
(74) *Attorney, Agent, or Firm* — Harness, Dickey & Pierce, P.L.C.

(57) ABSTRACT

A mounting bracket for a radar sensor is provided. The mounting bracket comprises a first layer and a second layer positioned adjacent to the first layer. The second layer has a higher absorption coefficient than the first layer for radar waves having a wavelength in a predetermined range of wavelengths. The mounting bracket is configured to be mounted in a predefined orientation such that the first layer is first exposed to radar waves transmitted by the radar sensor before the second layer is exposed to the radar waves. A radar system including the mounting bracket and methods for manufacturing the mounting bracket and for integrating the radar system in a vehicle are also disclosed.

5 Claims, 3 Drawing Sheets

MOUNTING BRACKET FOR A RADAR SENSOR

CROSS-REFERENCE TO RELATED APPLICATION

Figure 1:
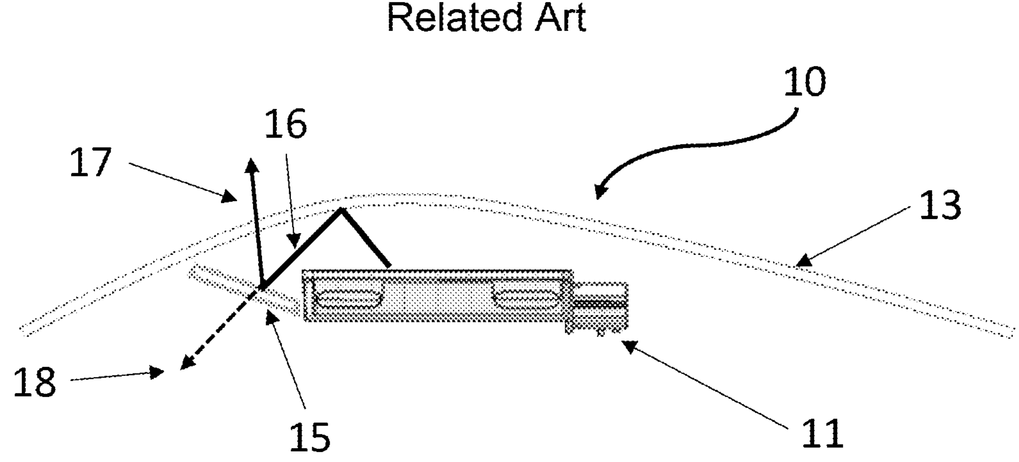

This application claims the benefit of European patent application serial number EP 22169495.3 filed on Apr. 22, 2022. The entire contents of which are hereby incorporated by reference herein.

FIELD

The present disclosure relates to a mounting bracket for a radar sensor, a radar system including such a mounting bracket and to methods for manufacturing such a mounting bracket and for integrating a radar system in a vehicle.

BACKGROUND

For autonomous driving and driver assistance systems, a reliable perception of the external environment of a vehicle is essential. In automotive perception systems, radar sensors are commonly used since they are able to provide the shape, the distance and the velocity of objects in the environment of the vehicle. The radar sensors are usually integrated in the interior of the vehicle behind the surface of further internal components, e.g. behind a bumper, a fascia, an emblem or a radome. The radar sensors may be located at corners or at the front of the vehicle, for example.

The integration of a radar sensor behind the surfaces of further components is always accompanied by the effect that a part of the energy transmitted by the radar sensor is reflected back to the radar sensor and into the interior of the vehicle. The interaction of radar waves transmitted by the radar sensor with a body in white of the vehicle and further internal reflections of the radar waves may cause that false positives or "ghost targets" are detected by the radar sensor. These false positives are detected at some distance in the external environment of the vehicle although the corresponding radar signals are caused by multiple internal reflections within the interior of the vehicle.

A bracket for mounting a radar sensor within a vehicle is usually made of regular plastic. In order to reduce the internal reflection of radar waves caused by the components in the interior of the vehicle, a radar absorbing material may be used for the bracket instead of regular plastic. Such a mounting bracket being made entirely from radar absorbing material may strongly reduce false positives due to internal reflections. However, radar absorbing materials are usually much more expansive than regular plastic, which strongly enhances the cost of a mounting bracket for a radar sensor.

In addition, the refractive index of the radar absorbing material is usually higher than the refractive index of regular plastic. Therefore, the reflection of radar waves caused by the mounting bracket is strongly increased if the mounting bracket consists of radar absorbing material. Due to this higher reflectivity of the mounting bracket, so-called multi-bounce paths are generated which include multiple reflections of the primary radar waves transmitted directly by the radar sensor.

Along some of the multi-bounce paths, the radar waves are transmitted to the external environment of the vehicle at multiple and other angles than the intended transmission angle of the primary radar waves. This may cause an increased angular error for the radar detections due to external reflections caused by the multi-bounce paths.

Accordingly, there is a need to provide a mounting bracket for a radar sensor, a radar system and methods for manufacturing such a mounting bracket and for integrating a radar system in a vehicle which are able to reduce false positives and angular errors of radar detections at the same time.

SUMMARY

The present disclosure provides a mounting bracket for a radar sensor, a radar system and to methods for manufacturing a mounting bracket of a radar sensor and for integrating a radar system in a vehicle according to the independent claims. Embodiments are given in the subclaims, the description and the drawings.

In one aspect, the present disclosure is directed at a mounting bracket for a radar sensor. The mounting bracket comprises a first layer and a second layer positioned adjacent to the first layer. The second layer has a higher absorption coefficient than the first layer for radar waves having a wavelength in a predetermined range of wavelengths. The mounting bracket is configured to be mounted in a predefined orientation such that the first layer is first exposed to radar waves transmitted by the radar sensor before the second layer is exposed to the radar waves.

Due to the predefined orientation of the mounting bracket, incident radar waves transmitted by the radar sensor first arrive at the first layer, and a part of these radar waves is reflected at the first layer. The other part being not reflected at the first layer passes through the first layer and arrives at the second layer. The part of the incident radar waves which arrives at the second layer is again partly reflected at the second layer and partly enters the second layer. Due to the higher absorption coefficient of the second layer, the radar waves entering the second layer are absorbed for the most part. Hence, a very small part of the incident radar energy passes through the mounting bracket due to the existence of the second layer. Therefore, the probability for internal reflections, e.g. within a vehicle, is decreased by the mounting bracket, which also reduces the probability for detecting false positives or "ghost targets" by the radar sensor.

The higher absorption coefficient of the second layer in comparison to the first layer is accompanied by a higher refractive index of the second layer which leads to higher reflection levels of the second layer for radar waves in comparison to the first layer. Conversely, the first layer has a lower reflection level than the second layer for radar waves due to the lower absorption coefficient of the first layer. The respective absorption coefficient of the first and second layers is defined for radar waves having their wavelength in the predetermined range, e.g. in a range of about 76.5 GHz.

Due to this, the mounting bracket has a low reflectivity for radar waves since the incident radar waves first encounter the first layer due to the mounting orientation of the mounting bracket. Moreover, the part of the radar waves which passes through the first layer and which is reflected as the second layer has to pass through the first layer for a second time before leaving the mounting bracket as reflected radar waves. Therefore, the energy of the part of the radar waves being reflected at the second layer is reduced due to the absorption in the first layer which this part of the radar wave has to pass twice.

For the predefined wavelength of the radar waves, the first layer may be designed to have a thickness resulting in a phase shift of 180 degrees between radar waves reflected from the first layer and radar waves reflected from the second layer. For such a design of the first layer, the radar waves reflected at the first and second layers cancel out each other due to destructive interference. This may be the major physical effect for the reduction of the reflected radar intensity of the mounting bracket.

Hence, the radar reflectivity of the mounting bracket is reduced by the first layer in comparison to a mounting bracket comprising e.g. the material of the second layer only. The reduction of the reflectivity is caused by the first layer having a lower radar reflectivity per se and by the absorption of radar waves reflected at the second layer within the first layer. Due to the reduced reflectivity, angle errors caused by multiple reflections along multi-bounce paths are reduced for radar detections performed by the radar sensor.

In summary, the occurrence of false positives and the occurrence angular errors of radar detections are decreased at the same time by the mounting bracket according to the disclosure.

The mounting bracket may further include a portion for mounting a radar sensor, e.g. by providing suitable clips within such a mounting portion. In addition, the mounting bracket may also include a mounting portion for the bracket itself, e.g. for connecting the bracket to a component in the interior of a vehicle.

According to an embodiment, the mounting bracket may further comprise fastening members for securing the first layer and the second layer adjacent to one another. Each of the first layer and the second layer may be removably secured by means of the fastening members on the mounting bracket.

For this embodiment, the first layer and the second layer may be manufactured as separate entities and may be secured to each other thereafter. This may facilitate the fabrication of the mounting bracket.

Moreover, the radar sensor may be mounted in the interior of a vehicle, for example, by preliminary or temporarily using the first layer only. Since the second layer may be regarded as a separate entity which may be removably secured at the first layer, the second layer may be secured optionally at the first layer if a higher absorption coefficient is required within the environment of the mounting bracket. This may provide flexibility for installing the second layer having the higher absorption coefficient for radar waves. For example, if the mounting bracket and the corresponding radar sensor are installed in the vicinity of vehicle components having a low radar reflectivity, the second layer may be omitted at first. However, if the radar reflectivity of the components increases due to changes during the design phase or during the lifetime of the vehicle, the second layer may be secured at the first layer of the mounting bracket via the fastening members.

The first layer may have a thickness which may be adapted in relation to an expected incident angle of radar waves so as to reduce the radar reflectivity of the mounting bracket for the expected incident angle. For example, the radar reflectivity may be at a minimum for the expected incident angle.

The expected incident angle defines the electric length within the first layer for the radar waves having a predefined wavelength. Since this electric length depends on the thickness of the first layer, the thickness of the first layer may be set such that destructive interference occurs between radar waves reflected at the first and second layers, which may lead to a reduction of reflected radar energy. This allows to adjust the thickness of the first layer such that the radar reflectivity of the entire mounting bracket is minimized.

The expected incident angle of radar waves may be predefined in accordance with an alignment or direction of the mounting bracket with respect to the radar sensor when the mounting bracket and the radar sensor are integrated in an intended environment, e.g. in an interior of a vehicle. Therefore, by adjusting the thickness of the first layer in order to reduce or even to minimize the reflectivity of the entire bracket including the first and the second layers, the radar reflectivity of the mounting bracket may be tailored for an intended alignment, i.e. for the intended installation position and installation direction, of the mounting bracket with respect to the radar sensor and therefore according to an intended environment in which the mounting bracket and the radar sensor are to be integrated.

Moreover, the first layer may include a plastic material, whereas the second layer may include a radar absorbing material. The plastic material may be polypropylene (PP), polyethylene (PE) or polybutylene terephthalate (PBT), for example. The radar absorbing material may also be based on these regular plastic materials, but may include coatings or inhomogeneities which are designed for absorbing radar waves having a given wavelength.

In another aspect, the present disclosure is directed at a radar system for a vehicle. The radar system comprises a radar sensor and a bracket for mounting the radar sensor. The radar sensor is configured to transmit radar waves to an external environment of the vehicle and to receive reflected radar waves. Furthermore, the radar sensor is mounted in an interior of the vehicle in the vicinity of a vehicle component. The bracket comprises a first layer facing the vehicle component and a second layer configured to be adjusted to the first layer. Moreover, the second layer has a higher absorption coefficient than the first layer for radar waves emitted by the radar sensor within a predetermined range of wavelengths.

Since the first layer of the bracket faces the vehicle component which is located in the vicinity of the mounting position of the radar sensor, the bracket is installed and aligned in accordance with a predefined mounting orientation for the bracket as described above. Therefore, the radar system is optimized by reducing or even minimizing the reflectivity of the bracket due to the first layer facing the vehicle component and, due to the absorption within the second layer, by suppressing internal reflections which could be generated by radar waves passing through the bracket. As a result, the occurrence of false positives and the occurrence angular errors of radar detections are decreased at the same time by the radar system according to the disclosure.

According to an embodiment, the radar sensor may have a predefined alignment with respect to the vehicle component, and the bracket may have an alignment with respect to the radar sensor such that the radar reflectivity of the bracket is at a minimum.

The alignment or installation direction of the radar sensor with respect to the vehicle component may be predefined in accordance with the desired transmission of radar waves provided by the radar sensor to the external environment of the vehicle. Based on the predefined alignment of the radar sensor, the bracket may be aligned in accordance with its mounting orientation in order to minimize the radar reflectivity at the bracket. Due to the minimized reflectivity, the intensity of the so-called multi-bounds paths may be minimized as well which might create angle errors for radar detections by the radar sensor. In other words, angle errors created by multi-bounds path may be minimized by minimizing the reflectivity of the bracket via its alignment with respect to the radar sensor.

The alignment of the bracket may further depend on an expected incident angle of radar waves reflected by the vehicle component. A thickness of the first layer may be set in relation to the expected incident angle so as to reduce the radar reflectivity of the bracket. For example, the radar reflectivity may be at a minimum for the expected incident angle.

The expected incident angle of radar waves may be provided in accordance with the alignment or installation direction of the radar sensor and of the vehicle component relatively to each other. For the expected incident angle, the orientation of the bracket in space may be adjusted such that the reflectivity of the bracket is reduced or is even at a minimum. In addition to the spatial orientation of the bracket, the thickness of the first layer may be set or optimized for the expected incident angle such that the reflectivity of the bracket is reduced or even at a minimum for the expected incident angle. Hence, the spatial orientation and the design of the bracket, i.e. the thickness of the first layer, may be tailored in accordance with the expected incident angle.

In another aspect, the present disclosure is directed at a method for manufacturing a mounting bracket for a radar sensor. According to the method, a first layer and a second layer of the mounting bracket are provided. The second layer is positioned adjacent to the first layer. Furthermore, the second layer has a higher absorption coefficient than the first layer for radar waves transmitted by the radar sensor within a predetermined range of wavelengths. A predefined orientation is defined for the mounting bracket such that the first layer is first exposed to radar waves transmitted by the radar sensor before the second layer is exposed to the radar waves.

The method is therefore provided for manufacturing the mounting bracket as described above. Hence, the benefits, the advantages and the disclosure as described above for the mounting bracket are also valid for the corresponding method according to the disclosure.

An expected incident angle at the first layer may be provided for the radar waves transmitted by the radar sensor, and a thickness of the first layer may be set so as to reduce the radar reflectivity of the bracket for the expected incident angle. For example, the radar reflectivity may be at a minimum for the expected incident angle.

The expected incident angle may be provided in relation to a desired arrangement of the radar sensor within an intended environment.

The expected incident angle may be determined by simulating multiple reflections of radar waves within the intended environment.

In another aspect, the present disclosure is directed at a method for integrating a radar system in an interior of a vehicle. The radar system includes a radar sensor and a bracket for mounting the radar sensor. The bracket has a first layer and a second layer configured to be adjacent to the first layer and having a higher absorption coefficient than the first layer for radar waves transmitted by the radar sensor within a predetermined range of wavelengths. According to the method, the bracket is mounted at a component of the vehicle in accordance with a mounting orientation. The mounting orientation is defined such that the first layer is first exposed to radar waves transmitted by the radar sensor before the second layer is exposed to the radar waves. The radar sensor is mounted at the bracket.

The method is therefore provided for integrating the radar system as described above. Hence, the benefits, the advantages and the disclosure as described above for the radar system are also valid for the corresponding method according to the disclosure.

The radar sensor may be mounted at the bracket in accordance with a predefined alignment with respect to the bracket. The predefined alignment may depend at least partly on an expected incident direction at a surface of the bracket for the radar waves transmitted by the radar sensor.

A thickness of the first layer of the bracket may correlate with the expected incident direction so as to reduce the radar reflectivity of the bracket for the expected incident direction. For example, the radar reflectivity may be at a minimum for the expected incident direction.

The expected incident direction may be determined by simulating multiple reflections of radar waves within the interior of the vehicle.

In another aspect, the present disclosure is directed at a vehicle comprising a radar system as described above.

In another aspect, the present disclosure is directed at a computer system, said computer system being configured to carry out several or all steps of the methods described herein.

The computer system may comprise a processing unit, at least one memory unit and at least one non-transitory data storage. The non-transitory data storage and/or the memory unit may comprise a computer program for instructing the computer to perform several steps or aspects of the methods described herein.

In another aspect, the present disclosure is directed at a non-transitory computer readable medium comprising instructions for carrying out several or all steps or aspects of the methods described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several steps or aspects of the methods described herein.

DRAWINGS

Figure 2:
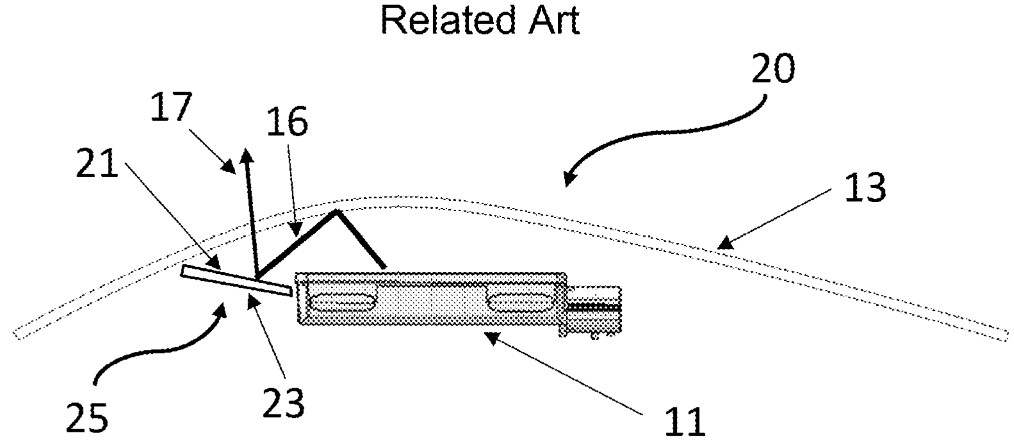
Figure 3:
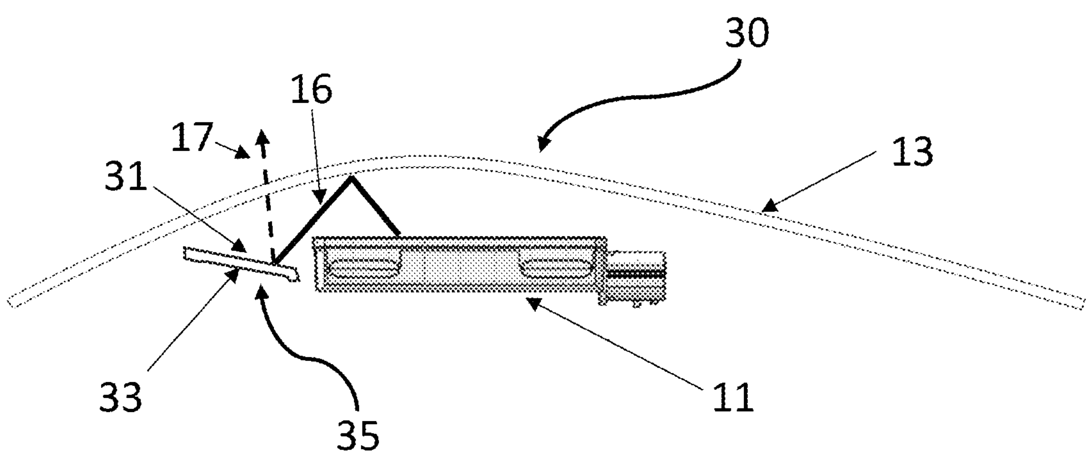

Exemplary embodiments and functions of the present disclosure are described herein in conjunction with the following drawings, showing schematically:

FIG. 1 a radar system of a vehicle according to the related art,

FIG. 2 another radar system of a vehicle according to the related art,

FIG. 3 a radar system of a vehicle according to the disclosure, and

Figure 4A:
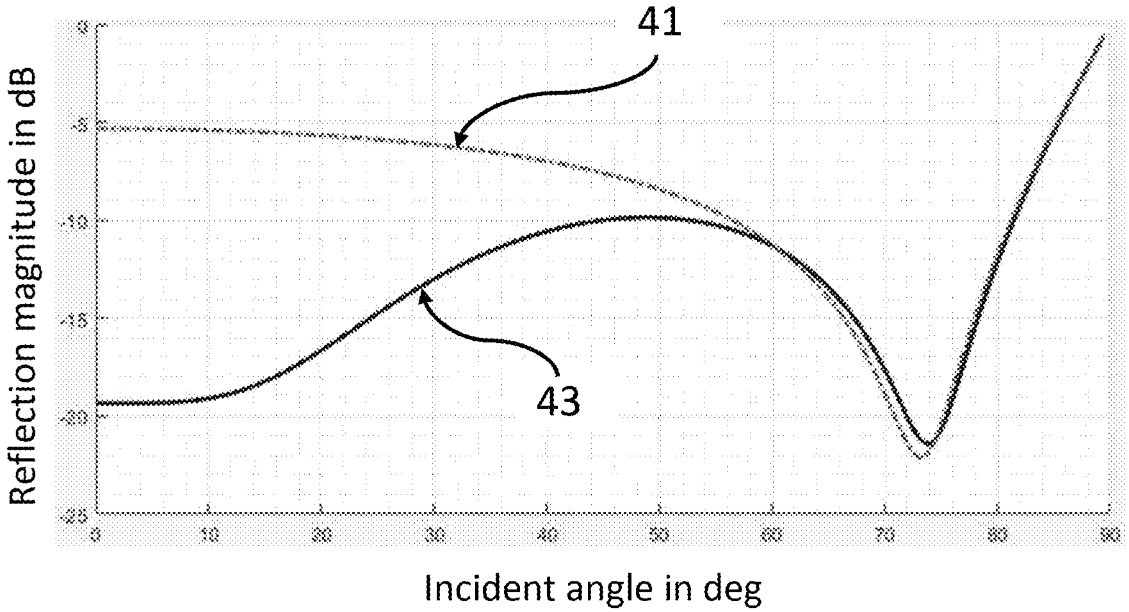
Figure 4B:
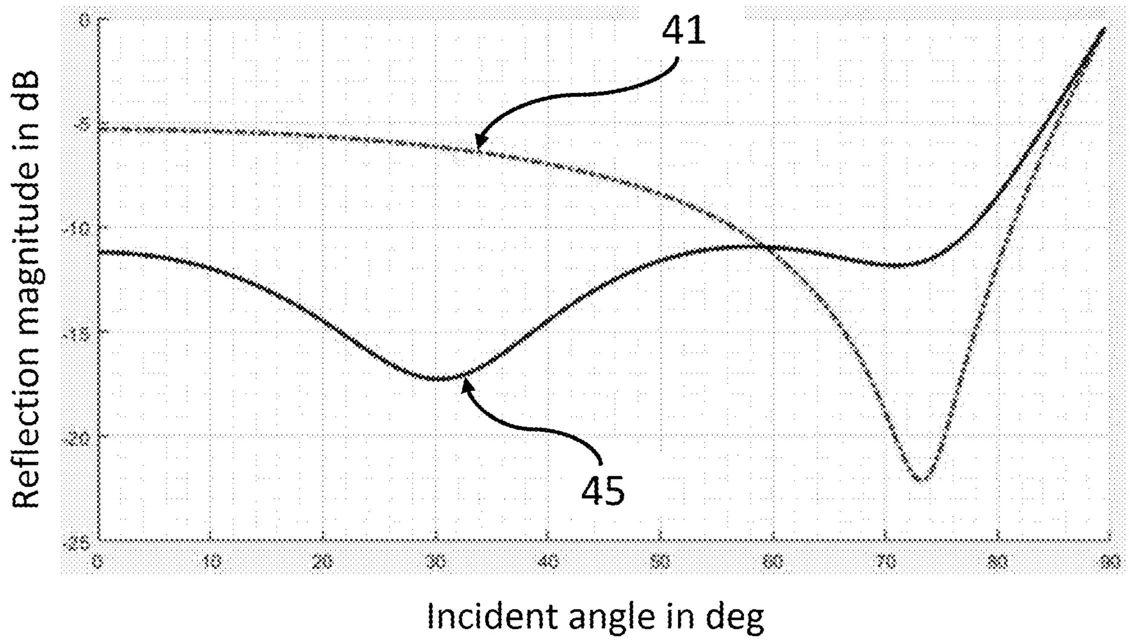

FIGS. 4A and 4B the reflection of a mounting bracket being optimized for two different incident angles.

DETAILED DESCRIPTION

FIG. 1 schematically depicts a radar system 10 which is integrated in a vehicle (not shown). The radar system 10 includes a radar sensor 11 being mounted in an interior of the vehicle behind one of the vehicle's components like a bumper or a fascia, for example. For the vehicle's component, a surface 13 is shown only. The radar sensor 11 is mounted in the interior of the vehicle via a bracket 15.

The radar sensor 11 is intended to transmit radio frequency or radar energy through the vehicle component represented by the surface 13 to the external environment of the vehicle. However, the surface 13 of the vehicle's component reflects a part of the radar waves transmitted by the radar sensor 11. The radar waves reflected by the surface 13 are represented by 16 in FIG. 1. A part of the reflected radar waves 16 is reflected again by the bracket 15, as indicated by 17 in FIG. 1. Another part of the reflected radar waves 16 passes through the bracket 15 into the interior of the vehicle, as indicated by 18 in FIG. 1.

The transmitted radar waves 18 which enter the interior of the vehicle are those radar waves which are neither reflected by the bracket 15, as indicated by 17, nor absorbed by the material of the bracket 15. Usually, the bracket 15 is made of regular plastic like polypropylene (PP), polyethylene (PE) or polybutylene terephthalate (PBT). If the radar bracket 15 is made from such materials, quite a large part of the reflected radar waves 16 passes through the bracket 15 as transmitted radar waves 18, i.e. into the interior of the vehicle. The transmitted radar waves 18 may cause internal reflections by further interior vehicle components.

Due to these internal reflections, a part of the radar energy transmitted by the radar sensor 11 arrives again at the radar sensor 11 after multiple reflections in the interior of the vehicle. Since the radar sensor 11 is generally configured to transmit radar waves to the external environment of the vehicle and to receive reflected radar waves in order to detect objects which are expected to be located in the external environment of the vehicle, false positives or "ghost targets" may be detected by the radar sensor 11 due to the internal reflections which are caused by the transmitted radar waves 18. In other words, objects are detected via the radar sensor 11 which are assumed to be located in the external environment of the vehicle although their detection signal is caused by internal reflections at internal vehicle components, e.g. components located behind the radar sensor 11. Due to this, the false positives are also called "ghost targets" since the radar sensor 11 detects objects which are actually not located in the external environment.

In order to reduce the intensity of the transmitted radar waves 18, the bracket 15 may be made from a radar absorbing material (RAM). The radar absorbing material may also be based on the regular plastic materials mentioned above, but may include coatings or inhomogeneities which are designed for absorbing radar waves having a given wavelength.

For this example, the entire bracket 15 includes the radar absorbing material instead of regular plastic. Although the transmitted radar waves 18 may be almost entirely suppressed by such a bracket 15, the radar waves 17 which are reflected by the bracket 15 may be enhanced since radar absorbing materials usually have a higher refractive index in comparison to regular plastic. Therefore, the path 17 of radar waves reflected by the bracket 15 which is also called "multi-bounce path" 17 since the multiple reflections of the primary radar waves are significantly enhanced if the bracket 15 consists of radar absorbing material only. Moreover, radar absorbing materials have a significantly higher raw material price in comparison to regular plastic.

The radar waves passing along the multi-bounce path 17 into the external environment of the vehicle may be further reflected by external objects. Therefore, a part of the energy of the radar waves passing along the multi-bounce path 17 arrives again at the radar sensor 15. However, the radar waves reflected by the bracket 15 have a different angle with respect to the radar sensor 11 than the primary radar waves which are transmitted from the radar sensor 11 to the external environment of the vehicle through the surface 13 without additional reflections. Due to this, the multi-bounce path 17 causes an increase of the angle error for objects detected by the radar sensor 11. Moreover, the transmitted radar waves 18 may also be reflected again in the interior of the vehicle and pass to the external environment through the surface 13. This may further increase the angle error of the radar sensor, i.e. regarding azimuth and/or elevation angle of detected objects.

In order to address these difficulties caused by internal reflections and by the multi-bounce path 17, another radar system 20 has been proposed in the related art which is shown in FIG. 2. The radar system 20 includes the same components as described above for the radar system 10 shown in FIG. 1, except for the bracket 25. The bracket 25 includes a first or upper layer 21 which is made of radar absorbing material and a second or lower layer 23 which is made of regular plastic.

For the radar system 20 as shown in FIG. 2, the path of the transmitted radar waves 18 (see FIG. 1) is almost entirely suppressed due to the first layer 21 which includes the radar absorbing material. In addition, the costs for the bracket 25 is reduced in comparison to a bracket 15 made entirely of radar absorbing material, since the bracket 25 consists only partly of the radar absorbing material, whereas the most part of the bracket 25 consists of regular plastic which forms the second layer 23. However, the bracket 25 still has a high reflectivity along the multi-bounce path 17 due to the higher refractive index of the radar absorbing material within the first layer 21. Hence, the problem regarding angle errors of radar detections cannot be overcome by the radar system 20 as shown in FIG. 2.

Therefore, a radar system is required which addresses both problems, i.e. false positives or "ghost targets" due to internal reflections caused by the transmitted radar waves 18 (see FIG. 1) and angle errors caused by the multi-bounce path 17.

FIG. 3 shows a radar system 30 according to the disclosure which is able to overcome both problems by suppressing the transmitted radar waves 18 and radar waves passing along the multi-bounce path 17 at the same time. The radar system includes the same components as described for the radar system 10 shown in FIG. 1 except for a bracket 35 which is provided for mounting the radar sensor 11 in the interior of the vehicle. The bracket 35 includes a first or upper layer 31 which is made of regular plastic and a second or lower layer 33 which is made of radar absorbing material.

Since the second or lower layer 33 includes the radar absorbing material, the path of transmitted radar waves 18 (see FIG. 1) is almost entirely suppressed. Therefore, the intensity of internal reflections, i.e. reflections at internal components of the vehicle, is also strongly reduced. Due to this, the problem regarding false positives or "ghost targets" caused by the transmitted waves 18 (see FIG. 1) is overcome.

Moreover, the first or upper layer 31 has a lower reflectivity for the radar waves 16 being reflected by the surface 13, i.e. both in comparison to a bracket 15 consisting entirely of radar absorbing material and also in comparison to the bracket 25 (see FIG. 2) which has a first or upper layer 21 consisting of radar adsorbing material. The intensity of radar waves along the multi-bounce path 17 is reduced since the first layer 31 being the upper layer is first exposed to the reflected radar waves 16, i.e. before the second layer 33 is exposed to the reflected radar waves 16.

In addition, the part of the radar waves 16 which is reflected at the second or lower layer 33 has to pass twice the first or upper layer 31 before these radar waves leave the bracket 35 along the multi-bounce path 17. Therefore, the intensity of the reflected radar waves is also reduced due to the absorption of the radar waves passing the first or upper layer 31 twice.

For a predefined wavelength of the radar waves transmitted by the radar sensor 11, e.g. for 76.5 GHz, the first layer 31 can be designed to have a thickness resulting in a phase shift of 180 degrees between radar waves reflected from the first layer 31 and radar waves reflected from the second layer 33. For such a design of the first layer 31, the radar waves reflected at the first and second layers 31, 33 cancel out each other due to destructive interference. This may be the major physical effect for the reduction of the reflected radar intensity of the bracket 35. The adjustment of the thickness of the first layer 31 will be described below in detail in context of FIGS. 4A and 4B.

In summary, the internal reflections due to the transmitted radar waves 18 and the multi-bounce path 17 are strongly reduced by the bracket 35 according to the disclosure in which the first or upper layer 31 is first exposed to the radar waves which are transmitted by the radar sensor 11 and reflected as radar waves 16 by the surface 13. In addition, the total reflectivity of the bracket 35, i.e. the reflectivity of both layers 31, 33 is significantly reduced in comparison to the bracket 25 as shown in FIG. 2.

The multi-bounce path 17 therefore includes a significantly reduced amount of energy which is transferred to the exterior of the vehicle. Due to this, the angle error of radar detections which might be caused by the multi-bounce path 17 is also strongly reduced. Since the second or lower layer 33 includes radar absorbing material, such internal reflections are also reduced which might transfer energy to the exterior of the vehicle. Hence, the angle error of the radar detections is further decreased due to the second or lower layer 33.

At one end, the bracket 35 is connected to a vehicle component which is not necessarily the vehicle component to which the surface 13 belongs. At this end, the bracket 35 has a mounting region for the connection to the vehicle component, wherein the connection may be provided by screws, adhesives or clips, for example. From the end at which the bracket 35 is connected to the vehicle component, the bracket 35 extends to the radar sensor 11 in a predefined direction in order to provide the desired alignment of the radar sensor 11 with respect to the surface 13 and with respect to the vehicle component to which the surface 13 belongs.

It is noted that the overall size of the bracket 35 may be very different and may depend on the specific manufacturer of the vehicle in which the radar sensor 11 is to be installed. In some vehicles, small brackets 35 are used which have a width of about 15 cm and a height of about 10 cm, for example, and which are intended just to support the radar sensor 11. In other vehicles, very huge brackets 35 are applied having a width of about 70 cm and a height of about 50 cm, for example. For the latter brackets 35, the radar sensor 11 is just one of several vehicle modules that are clipped into the bracket 35. Generally, the thickness of the respective first and second layers 31, 33 is approximately in a range of about 3 mm+/−0.5 mm.

Along the predefined direction extending from the vehicle component to the radar sensor, a boundary between the first layer 31 and the second layer 33 extends, i.e. in parallel to the predefined direction. A thickness of the first layer 31 and a thickness of the second layer 33 are defined perpendicularly to the predefined direction, i.e. perpendicularly to the boundary between the first layer 31 and the second layer 33.

At a second end of the bracket 35 being opposite to the first end, the radar sensor 11 is mounted to the bracket 35, e.g. via clips.

When the bracket 35 is mounted in a vehicle together with the radar sensor 11, the first layer 31 entirely covers the second layer 33 which includes the radar absorbing material and has therefore a higher absorption coefficient for radar waves than the first layer 31. The bracket 35 is mounted in such a manner with respect to the radar sensor and with respect to the surface 13 of the vehicle component that the first layer 31 faces or is exposed to a region for which it is expected that radar waves 16 are reflected from the surface 13 of the vehicle component. Therefore, the alignment of the first layer 31 covering the second layer 33 with respect to the surface 13 of the vehicle component and with respect to the radar sensor 11 defines a mounting orientation of the bracket 35. The term mounting orientation means that the bracket 35 is to be mounted in such a manner that the first layer 31 is expected to be exposed to radar waves which are transmitted by the radar sensor 11 and which are reflected by a further item, like the surface 13, in the environment of the radar sensor 11 and the bracket 35.

When the radar system 30 is installed in a vehicle, the radar sensor 11 has a predefined or desired alignment within the interior of the vehicle. Accordingly, the radar sensor 11 also has a predefined or desired alignment with respect to the vehicle component which includes the surface 13. Accordingly, the bracket 35 has to be installed in the interior of the vehicle such that the desired alignment of the radar sensor 11 is achieved.

Due to this, one or more incident angles or incident directions can be identified for the reflected radar waves 16 with respect to an upper surface of the first layer 31. For these expected incident angles, it is desired that the intensity of the reflected radar waves 16 is at a maximum. The reflectivity of the bracket 35 for the radar waves 16 being reflected at the surface 13 depends on the reflectivity at the upper surface of the first layer 31 and on the path of radar waves which are passing through the first layer 31 and which are reflected at the second layer 33.

Since the first layer 31 has a lower absorption coefficient for the radar waves 16 than the second layer 33 and since the second layer 33 has a higher reflectivity for the radar waves 16, a part of the energy provided by the radar waves 16 is transferred through the first layer 31. Due to the reflection at the second layer 33, this part may further be transferred via the multi-bounce path 17 to the exterior of the vehicle. However, the thickness of the first layer 31 can be tuned or adapted such that the reflectivity of the entire bracket 35 along the multi-bounce path 17 is minimized for expected incident angles or incident directions.

In order to optimize the thickness of the first layer 31 for designing the bracket 35, an initial value of this thickness is determined according to requirements for the mechanical stability of the bracket 35. The thickness of the second layer 33 is set to achieve sufficient absorption in order to suppress false positives or "ghost targets".

The expected or given incident angle and the thickness of the first layer 31 determine the electrical length for radar waves having a given wavelength and travelling through the first layer 31. For reflected radar waves, the thickness of the first layer 31 therefore corresponds to an electrical thickness. By applying ABCD matrices or radio frequency simulation algorithms which are known in the art, it can be shown that a minimum of the reflected radar intensity or energy occurs for the bracket 35 if the electrical thickness of the first layer 31 is at an odd-numbered multiple of the quarter wavelength, i.e. ¼, ¾, 5/4, 7/4 times the wavelength of the radar waves transmitted by the radar sensor 11. Conversely, the thickness of the first layer 31 is optimized regarding minimum radar reflectivity of the bracket 35 by selecting the specific multiple of the quarter wavelength as the electrical thickness which is closest to the initial value for the thickness of the first layer 31 described above.

Results for such an optimization are shown in FIGS. 4A and 4B. In these figures, the reflection magnitude in dB on the y-axis is depicted over the incident angle in degrees (deg) on the x-axis. In FIGS. 4A and 4B, an analytical calculation result is provided for radar waves at 76.5 GHz and for a horizontal antenna polarization of the radar sensor 11. A reflection magnitude of 0 dB corresponds to an amount of 100% of reflected energy. For the calculations, an initial value of 3 mm has been used for the thickness of the first and second layers 31, 33.

In FIGS. 4A and 4B, the curve 41 represents the reflection magnitude for a bracket 25 as shown in FIG. 2 in which the radar absorbing material is included in the first or upper layer 21 which faces the incident radar waves 16 and is located on top of the second layer 23 made of regular plastic. The curve 41 indicates that a high reflection magnitude is to be expected for the bracket 25 (see FIG. 2) for incident angles lower than about 45 degrees. In detail, the reflection magnitude is about −5 dB for small angles for the bracket 25 according to the related art, which corresponds to approximately 30% of reflected energy for the surface of the bracket 25.

The curve 43 represents the calculation result for the bracket 35 according to the disclosure as shown in FIG. 3, i.e. having a first layer 31 made of regular plastic on top of a second layer 33 made of radar absorbing material, such that the second layer 33 has a higher radar absorption coefficient than the first layer 31. For the curve 43, the thickness of the first layer 31 has been optimized for an incident angle of 0°. For this incident angle, the optimization results in a thickness of 2.96 mm for the first layer 31 made of polypropylene (PP). Similarly, FIG. 4B includes a curve 45 representing the reflection magnitude for the bracket 35 (see FIG. 3) for which the thickness of the first layer 31 has been optimized for an incident angle of 30 degrees. For this incident angle, the optimization results in a thickness of 3.10 mm for the first layer 31 made of polypropylene (PP).

As can be seen in FIG. 4A, the reflectivity of the bracket 35 according to the curve 43 is strongly reduced for small angles in comparison to the curve 41. Due to the optimization of the thickness of the first layer 31, a reduction of reflectivity of approximately −19 dB is achieved. This corresponds to a reduction of the amount of reflected energy to approximately 1.3%, i.e. in comparison to the reflection of 100% for 90 degrees. For curve 45 as shown in FIG. 4B, the reflectivity of the bracket 35 is reduced by approximately −17 dB if the thickness of the first layer 31 is optimized for an expected incident angle of 30 degrees for which the minimum of the curve 45 is provided.

Therefore, by optimizing the thickness of the first layer 31 according to the expected incident angle, the bracket 35 can be "tailored" for the predefined or desired alignment of the radar system 30 within the interior of the vehicle, i.e. with respect to the surface 13 of a vehicle component in the vicinity of the radar sensor 11. In other words, a maximum reduction can be achieved for the reflectivity of the radar waves 16 at the bracket 35 (see FIG. 3) by optimizing the thickness of the first layer 31 for the individual scenario of integrating the radar system 30 in a vehicle.

Similar results as shown in FIGS. 4A and 4B are achieved if vertically polarized radar waves are assumed. Moreover, further calculation results show that manufacturing tolerances of the first layer 31 which are typical for automotive series production applications do not adversely affect the strong reduction of the reflectivity at the expected incident angle.

In summary, the bracket 35 according to the disclosure allows for a simultaneous optimization regarding the reduction of the reflectivity of the bracket 35, i.e. by optimizing the thickness of the first layer 31, and regarding the suppression of internal reflections and "ghost targets" by the second layer 33 including radar absorbing material. In order to determine the expected incident angle or incident direction of the radar waves 16 (see FIG. 3), an electromagnetic simulation can be performed for the intended alignment of the radar sensor 11 within the interior of the vehicle, i.e. with respect to the surface 13, and for the corresponding alignment of the bracket 35. Such an electromagnetic simulation is described in EP 19 183 296 A1, for example. Moreover, the expected occurrence of internal reflections and "ghost targets" can be simulated in order to define the alignment of the radar system 30, i.e. the alignment of the radar sensor 11 and of the corresponding mounting bracket 35. Such a simulation is described in EP 3 754 361 A1, for example. By such simulations and by the optimization of the bracket 35, the amount of expensive radar absorbing material can be minimized, e.g. by designing the second layer 33 accordingly. This results in reduced cost for the radar system 30.

REFERENCE NUMERAL LIST

10 radar system according to the related art
11 radar sensor
13 surface of a vehicle component
15 mounting bracket according to the related art
16 reflected radar waves
17 multi-bounce path
18 transmitted radar waves
20 radar system according to the related art
21 first layer made of radar absorbing material
23 second layer made of regular plastic
25 mounting bracket according to the related art
30 radar system according to the disclosure
31 first layer made of regular plastic
33 second layer made of radar absorbing material
35 mounting bracket according to the disclosure
41 curve of reflection magnitude for a bracket according to the related art
43 curve of reflection magnitude for a bracket according to the disclosure, optimized for an incident angle of 0°
45 curve of reflection magnitude for a bracket according to the disclosure, optimized for an incident angle of 30°

The invention claimed is:

1. A radar system for a vehicle, comprising:

a radar sensor configured to transmit radar waves to an external environment of the vehicle and to receive reflected radar waves, the radar sensor being mounted in an interior of the vehicle in the vicinity of a vehicle component, and a bracket for mounting the radar sensor, the bracket comprising a first layer facing the vehicle component and a second layer configured to be adjacent to the first layer, wherein the second layer has a higher absorption coefficient than the first layer for radar waves emitted by the radar sensor within a predetermined range of wavelengths, the second layer further including a radar absorbing material including coatings or inhomogeneities which are designed for absorbing radar waves having a given wavelength, the radar sensor has a predefined alignment with respect to the vehicle component, the bracket has an alignment with respect to the radar sensor such that a radar reflectivity of the bracket is at a minimum, the alignment of the bracket depends on an expected incident angle of radar waves reflected by the vehicle component, and a thickness of the first layer is set in relation to the expected incident angle so as to reduce the radar reflectivity of the bracket.

2. A method for manufacturing a mounting bracket for a radar sensor, the method comprising:

providing a first layer of the mounting bracket, providing a second layer of the mounting bracket, the second layer being positioned adjacent to the first layer and having a higher absorption coefficient than the first layer for radar waves transmitted by the radar sensor within a predetermined range of wavelengths, the second layer further including a radar absorbing material including coatings or inhomogeneities which are designed for absorbing radar waves having a given wavelength, and defining a predefined orientation for the mounting bracket such that the first layer is first exposed to radar waves transmitted by the radar sensor and reflected by a further item before the second layer is exposed to the radar waves, wherein an expected incident angle at the first layer is provided for the radar waves transmitted by the radar sensor, wherein the expected incident angle is predefined in accordance with an alignment of the mounting bracket with respect to the radar sensor when the mounting bracket and the radar sensor are integrated in an intended environment, and a thickness of the first layer is set so as to reduce a radar reflectivity of the bracket for the expected incident angle.

3. The method according to claim 2, wherein the expected incident angle is determined by simulating multiple reflections of radar waves within the intended environment.

4. A method for integrating a radar system in an interior of a vehicle, wherein the radar system includes a radar sensor and a bracket for mounting the radar sensor, the bracket having a first layer and a second layer configured to be adjacent to the first layer and having a higher absorption coefficient than the first layer for radar waves transmitted by the radar sensor within a predetermined range of wavelengths, the second layer further including a radar absorbing material including coatings or inhomogeneities which are designed for absorbing radar waves having a given wavelength, the method comprising:

mounting the bracket at a component of the vehicle in accordance with a mounting orientation, wherein the mounting orientation is defined such that the first layer is first exposed to radar waves transmitted by the radar sensor before the second layer is exposed to the radar waves, and mounting the radar sensor at the bracket, wherein the radar sensor is mounted at the bracket in accordance with a predefined alignment with respect to the bracket, the predefined alignment depends at least partly on an expected incident direction at a surface of the bracket for the radar waves transmitted by the radar sensor and reflected by the component of the vehicle, and a thickness of the first layer of the bracket correlates with the expected incident direction so as to reduce a radar reflectivity of the bracket for the expected incident direction.

5. The method according to claim 4, wherein the expected incident direction is determined by simulating multiple reflections of radar waves within the interior of the vehicle.

* * * * *